Figure 1:
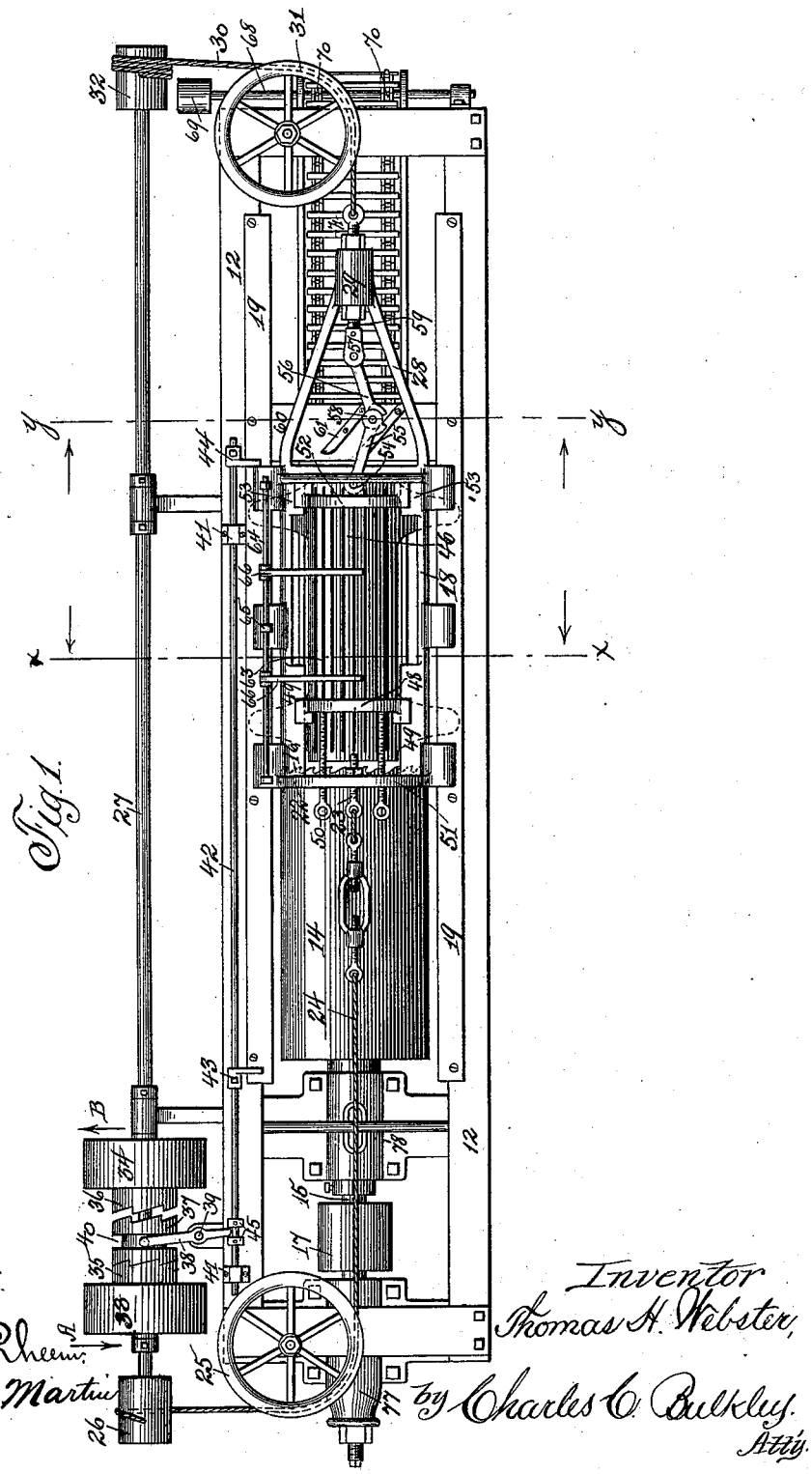

(No Model.)  3 Sheets—Sheet 1.
T. H. WEBSTER.
MACHINE FOR SAWING STAVES.
No. 534,383.  Patented Feb. 19, 1895.

Witnesses.  Inventor
Wm. M. Rheem  Thomas H. Webster,
James C. Martin  by Charles C. Bulkley.
  Atty.

(No Model.) 3 Sheets—Sheet 3.

T. H. WEBSTER.
MACHINE FOR SAWING STAVES.

No. 534,383. Patented Feb. 19, 1895.

Witnesses.
Wm. M. Rheem
James C. Martin

Inventor.
Thomas H. Webster,
by Charles C. Bulkley, Atty.

UNITED STATES PATENT OFFICE.

THOMAS H. WEBSTER, OF TURNER, ASSIGNOR OF TWO-THIRDS TO CORNELIUS L. WEBSTER AND FRED E. WEBSTER, OF CHICAGO, ILLINOIS.

MACHINE FOR SAWING STAVES.

SPECIFICATION forming part of Letters Patent No. 534,383, dated February 19, 1895.

Application filed August 25, 1893. Serial No. 484,029. (No model.)

*To all whom it may concern:*

Be it known that I, THOMAS H. WEBSTER, a citizen of the United States, residing at Turner, in the county of Du Page and State of Illinois, have invented certain new and useful Improvements in Machines for Sawing Staves, of which the following is a specification.

My invention relates to certain improvements in that class of machines for sawing staves which employ either a straight cylinder or drum saw or a bilged cylinder or drum saw positioned horizontally and into the open end of which that portion of the bolt being cut into a stave passes, the bolt being sawed by teeth formed on the circular edge of the saw.

My invention has for its object the provision of means by which the sawed stave after separation from the bolt, which latter is then over the saw, may be automatically and instantly conveyed and transferred preferably toward the end of the machine and finally delivered at this point.

My invention further has, as its object, the provision of means by which the traveling carriage holding and moving the bolt or stave may be automatically propelled along its guide ways to effect the operation of sawing in drawing the bolt against the saw.

My invention has a further object in the provision of means by which the bolt is held upon the traveling bolt carriage and by which said bolt may be readjusted accurately and automatically to successively in turn saw staves of a predetermined thickness.

My object further is to accomplish these results with a minimum number of parts and by mechanism which will withstand operative strain or stress, the devices to accomplish these results being simple and effective and invariable in action and of a character to operate without the attention of a specially skilled attendant.

My invention consists in a stave sawing machine having a cylinder or drum saw mounted to rotate, a bolt carriage carrying the bolt to and from the saw, means for causing or effecting this movement, devices mounted upon the carriage for feeding the bolt automatically as each stave is severed to bring the bolt in position to again sever another stave and also for holding the bolt while the same is being so fed and an endless carrier which receives the staves as the same are severed and conveys and delivers the same at the end of the machine.

My invention consists further in certain details of construction, arrangement of parts and other combinations to be hereinafter particularly described and pointed out in my claims reference being now had to the accompanying drawings, in which—

Figure 2:
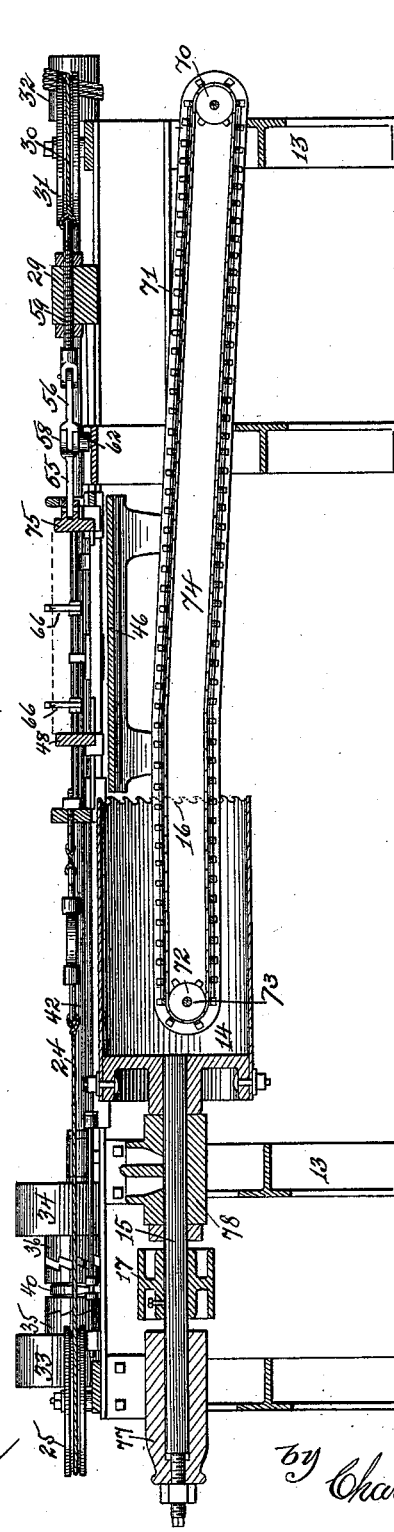
Figure 3:
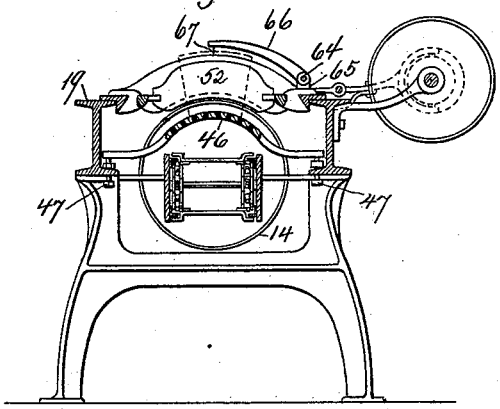
Figure 4:
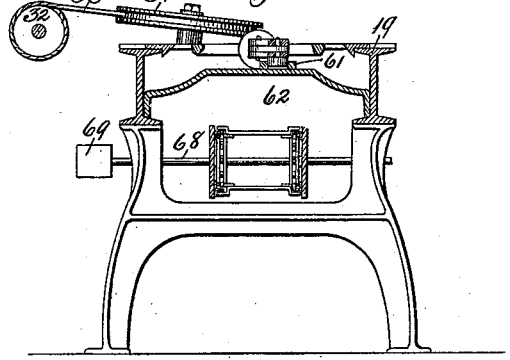
Figure 5:
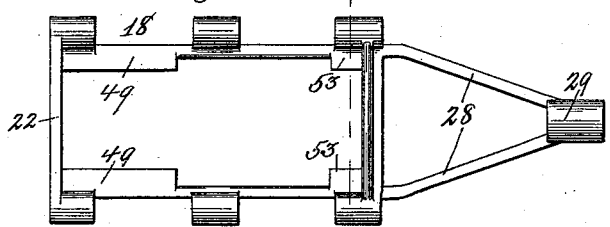
Figure 6:
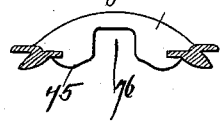

Figure 1 is a plan view of the complete machine. Fig. 2 is a central longitudinal section of the same. Fig. 3 is a cross sectional view on the line $x-x$ of Fig. 1. Fig. 4 is a like view on the line $y-y$ of Fig. 1. Fig. 5 is a detail plan view of the traveling bolt carriage. Fig. 6 is a detail view on the line $z-z$ of Fig. 5.

The bed frame of the machine is designated at 12 supported upon the standards 13 in the usual manner. The saw 14 is mounted horizontally upon the main drive shaft 15 and is of the ordinary tubular and circular form having upon its edge at the open end thereof the usual saw teeth 16. The shaft 15 is driven by the pulley 17 belted with the line shaft or by any other suitable means.

Referring now to the mechanism by which the bolt is automatically self adjusted, and approached toward and away from the saw in the operation of sawing, the numeral 18 designates a traveling bolt carriage mounted upon the guide ways 19. Secured to the cross bar 22 at one end of the carriage 18 by means of the threaded bolt 23 is a flexible cable 24 which extends to and passes about the directing sheave 25, the said cable 24 being secured to the winding drum 26, the latter being fixed on the one end of the carriage actuating shaft 27 positioned parallel with the machine. Extended from the opposite end of the carriage 18 is a frame 28 having at its converging end the embossment 29 to which latter the flexible cable 30 is secured. This cable after passing about the directing sheave 31 is secured to the winding drum 32 on that end of the actuating shaft 27 opposite to the one bearing the drum 26. Mounted loosely upon the said carriage actuating shaft 27 are the two pulleys 33 and 34 which pulleys are provided with the clutch faces 35 and 36 and are driven by a straight and cross belt in different directions as indicated by the arrows A and B. Keyed upon the shaft 27 is the laterally movable clutch member 37. A rocker arm 38 having a bifurcated end, as shown by dotted lines in Fig. 3, is pivoted at 39 on the frame 12, the bifurcations embracing the clutch member 37 in the groove 40. Held within bearings 41 on the frame 12 is a shifting rod 42 having secured thereto the stops 43, 44 and the collars 45, 45 between which one end of the rocker arm 38 is held.

The operation of this portion of my device is as follows: Assuming a bolt to have been adjusted and held in position upon the carriage 18, in a manner to be described, in the operation of the machine, the clutch member 37 being engaged with the clutch face 35 of the pulley 33, the shaft 27 is rotated in the direction of the arrow A, thus winding the cable upon the drum 26 and pulling the carriage 18 with its bolt toward the saw 14, the said bolt passing over the saw in the operation of sawing except as to that portion being cut into a stave. When the stave has been completely sawed from the bolt the carriage 18 comes in contact with the stop 43 shifting the rod 42 and engaging the clutch member 37 with the clutch face 36 of the pulley 34, traveling in the direction indicated by the arrow B. The said pulley then rotates the shaft 27 in an opposite direction, winding the cable 30 upon the drum 32, unwinding the cable 24 and drawing the carriage away from the saw into a position to again saw another stave. When the carriage 18 arrives at the point in which the bolt is properly positioned to again saw the stave, the carriage comes in contact with the stop 44 thus shifting the rod 42 so that the carriage is then pulled forward by means previously described. It is now apparent that this result of causing a travel of the carriage toward and away from the saw is accomplished automatically and by mechanism simple, direct and positive in character, those parts immediately performing the result of drawing or pulling or reciprocating the carriage in two different directions being comprehended within the term tractor devices.

Proceeding now to a description of the bolt adjusting devices the numeral 46 designates a convex or semi-circular bolt rest and former the curvature of which is made to correspond with the curvature of the under side of the bolt when a stave has been sawed therefrom. Bolts 47 (Fig. 3) are provided having jam nuts by means of which the rest 46 may be vertically adjusted.

The relatively stationary bolt clamp is designated at 48 being mounted upon the guide ways 49 of the carriage 18 and having the threaded bolts 50 connected therewith which bolts pass through the cross bar 51 of the carriage. By means of these bolts the relatively stationary position of the clamp 48 may be manually varied as desired for differing lengths of bolt. Opposite to this stationary clamp 48 is the automatically movable bolt clamp 52 mounted upon the ways 53 of the carriage 18.

Pivoted at 54 to the bolt clamp 52 is a link 55 which latter terminates at, and with the link 56 pivoted to the bearing stud 57 forms the knuckle joint 58. The stud bearing 57 has a screw threaded shank 59 by which this elbow lever mechanism may be manually adjusted in the embossment 29.

Secured to the cross piece or bridge 60 of the frame 12 are the ways 61 between which the antifriction roller 62 (Fig. 4) travels, this roller being secured to and beneath the knuckle joint 58.

The bolt rest and form 46 is slotted at 63 so that the saw dust may fall through the same.

Mounted fixedly upon the rod 64 held in the bearings 65 on the carriage are the holding arms 66 on the ends of which latter are the engaging pins 67, (Fig. 3.)

The operation of this feature of my device is as follows: When the clamps 48 and 52 are apart, the bolt, as shown in dotted lines Fig. 3, may be placed between them and held in position on the convex rest and form 46 by means of the arms 66. In the forward advance of the carriage 18 toward the saw, the antifriction roller 62 traveling in the ways 61 draws the knuckle joint 58 toward the longitudinal center of the machine and in so doing actuates the links 55 and 56, advancing the movable clamps 52 toward the stationary clamp 48 and thus engages and holds the bolt tightly clamped between them as the bolt is brought in contact with the saw. Upon the return of the carriage the elbow lever mechanism is actuated to slightly withdraw the clamp 52, releasing the bolt momentarily and permitting the latter to fall or feed downward by gravity upon the rest and form 46 which by reason of its convex surface holds the bolt so that a stave is successively and automatically cut of the desired thickness and shape. The vertical adjustability of the rest and form 46 also adapts the machine for sawing staves of different thicknesses. It is now apparent that a bolt of any suitable size may be completely sawed into a number of staves without any intervention on the part of the operator since the carriage is automatically caused to approach and recede from the saw in the operation of sawing and the bolt permitted and caused to effect a proper readjustment automatically for each successive cut of the saw.

Referring now to means employed in my invention by which each successively severed and sawed stave is received and conveyed to a point of delivery at the end of the machine, the numeral 68 designates a drive shaft mounted upon the frame 12 at the end of the machine and having on one end thereof the pulley wheel 69 belted with the line shaft.

Mounted upon this shaft 68 are the sprocket wheels 70 about which latter the endless carrier 71 passes, this carrier extending as shown in Fig. 2 to a point within the interior of and near the closed end of the saw 14 the opposite end or turn of said carrier 71 passing about the sprocket wheels 72 which latter are mounted upon the shaft 73 in turn mounted upon the carrier end pieces 74.

The operation of this portion of my device is as follows: In each instance it is apparent that the severed stave, when the operation of sawing is completed falls within the interior of the saw, and heretofore it has been necessary to provide means by which each stave is withdrawn from within the interior. These means have however been of such a character as to merely remove each stave in such a manner as to require a special attendant who must stand in close proximity to the saw and manually dispose of each stave. In my machine however it is evident that each stave after complete separation from the bolt, which latter is then over the saw, falls upon the carrier and is conveyed and delivered at the end of the machine. It is further evident that with my devices the stave is invariably removed from the saw.

In Fig. 6 is shown the cross bar 75 of the carriage having the cut out portion 76 to clear the pivotal connection 54. The main drive shaft 15 is mounted within the bearings 77 and 78, which latter as shown, are both positioned on one side of the saw only, the shaft itself terminating at the rear or closed end of the saw and being secured to the saw at this point, by which construction the interior of the saw is freed from all obstructions so that the carrier may be positioned therein.

Having thus described my invention, what I claim as new therein, and desire to secure by Letters Patent, is—

1. In a machine for sawing staves, the combination with a cylinder or drum saw mounted in a stationary longitudinal position, means for revolving said saw, a traversable bolt carriage, tractor devices for causing the carriage to approach and recede from the saw, oppositely moving mechanisms for operating said tractor devices, means for alternately engaging each of the oppositely moving mechanisms with the tractor devices to reciprocate the carriage and bolt in two different directions, a convex bolt rest upon which the bolt is held, a movable bolt clamp mounted on the carriage, automatic devices for operating said clamp, a relatively stationary clamp and holding devices engaging the bolt to maintain the same in alignment when the clamps are released.

2. In a machine for sawing staves, the combination with a cylinder or drum saw mounted in a stationary longitudinal position, means for revolving said saw, a traversable bolt carriage, tractor devices for causing the carriage to approach and recede from the saw, oppositely moving mechanisms for operating said tractor devices, means for alternately engaging each of the oppositely moving mechanisms with the tractor devices to reciprocate the carriage and bolt in two different directions, a convex bolt rest upon which the bolt is held, a movable bolt clamp mounted on the carriage, automatic devices for operating said clamp, a relatively stationary clamp, holding devices engaging the bolt to maintain the same in alignment when the clamps are released, and an endless carrier a portion of which is located within the interior of the saw and adapted to receive the separated stave and deliver the same at the end of the machine.

3. In a machine for sawing staves the combination with a cylinder or drum saw mounted in a stationary longitudinal position, means for revolving said saw, a traversable bolt carriage, tractor devices for causing the carriage to approach and recede from the saw, oppositely moving mechanisms for operating said tractor devices and shifting mechanism for alternately engaging each of the oppositely moving mechanisms with the tractor devices to reciprocate the carriage and bolt in two different directions, a convex bolt rest upon which the bolt is held, a movable bolt clamp, a relatively stationary clamp, holding devices engaging the bolt to maintain the same in alignment when the clamps are released, and an endless carrier a portion of which is located within the interior of the saw and adapted to receive the separated stave and deliver the same at the end of the machine.

4. In a machine for sawing staves the combination with a cylinder or drum saw mounted in a stationary longitudinal position, means for revolving said saw, a traversable bolt carriage, tractor devices for causing the carriage to approach and recede from the saw, oppositely moving mechanisms for operating said tractor devices, shifting mechanisms for alternately engaging each of the oppositely moving mechanisms and stops engaged by the carriage to operate the shifting mechanism, a convex bolt rest upon which the bolt is held, a movable bolt clamp mounted on the carriage, automatic devices for operating said clamp, a relatively stationary clamp, holding devices engaging the bolt to maintain the same in alignment when the clamps are released, and an endless carrier a portion of which is located within the interior of the saw and adapted to receive the separated stave and deliver the same at the end of the machine.

5. In a machine for sawing staves the combination of a cylinder or drum saw mounted in a stationary longitudinal position, means for revolving said saw, a traversable bolt carriage, pulley wheels mounted loosely upon a common shaft, clutch mechanism adapted to alternately engage said pulleys which latter are driven in opposite directions, tractor devices connected with said common shaft and with the carriage, shifting mechanism operating the clutch mechanism, a convex bolt rest upon which the bolt is held, a movable bolt clamp mounted on the carriage, automatic devices for operating said clamp, a relatively stationary clamp, holding devices engaging the bolt to maintain the same in alignment when the clamps are released, and an endless carrier a portion of which is located within the interior of the saw and adapted to receive the separated stave and deliver the same at the end of the machine.

6. In a machine for sawing staves the combination of a cylinder or drum saw mounted in a stationary longitudinal position, means for revolving said saw, a traversable bolt carriage, pulley wheels mounted loosely upon a common shaft clutch mechanism adapted to alternately engage said pulleys which latter are driven in opposite directions, tractor devices connected with said common shaft and with the carriage, shifting mechanism operating the clutch mechanism, stops engaged by the carriage to operate the shifting mechanism, a convex bolt rest upon which the bolt is held, a movable bolt clamp mounted on the carriage, automatic devices for operating said clamp, a relatively stationary clamp, and holding devices engaging the bolt to maintain the same in alignment when the clamps are released.

7. In a machine for sawing staves the combination with a cylinder or drum saw mounted in a stationary longitudinal position, and means for revolving said saw, of a traversable bolt carriage having devices mounted thereon for holding and permitting automatic readjustment of the bolt comprising bolt clamps mounted upon the carriage, one or more of which clamps are movable along said carriage, clamp actuating devices operated by the reciprocation of the carriage to engage and release the clamp or clamps with or from the bolt, a convex bolt rest upon which the bolt is held and clamping mechanism automatically released to permit a gravity feed of the bolt and engaged with the bolt synchronously with the automatic change in direction of movement of the carriage and holding devices engaging the bolt to maintain the same in alignment when the clamps are released.

8. In a machine for sawing staves the combination with a cylinder or drum saw mounted in a stationary longitudinal position, and means for revolving said saw of a traversable bolt carriage having devices mounted thereon for holding and permitting automatic readjustment comprising bolt clamps, one of which is mounted in a relatively stationary position upon the bolt carriage and the other one of which is mounted upon and movable along said carriage, clamp actuating devices operated by the reciprocation of the carriage to engage or release the clamp or clamps with or from the bolt, a convex bolt rest upon which the bolt is held and clamping mechanism automatically released to permit a gravity feed of the bolt and engaged with the bolt synchronously with the automatic change in direction of movement of the carriage, holding devices engaging the bolt to maintain the same in alignment when the clamps are released and an endless carrier a portion of which is located within the interior of the saw and adapted to receive the separated stave and deliver the same at the end of the machine.

9. In a machine for sawing staves, the combination with a cylinder or drum saw and means for revolving said saw, of a traversable bolt carriage having mounted thereon a relatively stationary clamp and clamp actuating devices also mounted upon said carriage, comprising levers operated by fixed ways in the reciprocation of the bolt carriage to automatically engage and release the bolt, a convex bolt rest upon which the bolt is held and clamping mechanism automatically released to permit a gravity feed of the bolt and engaged with the bolt synchronously with the automatic change in direction of movement of the carriage, and holding devices engaging the bolt to maintain the same in alignment when the clamps are released.

10. In a machine for sawing staves the combination with a cylinder or drum saw and means for revolving said saw, of a traversable bolt carriage having mounted thereon a relatively stationary clamp, a movable clamp also mounted upon said carriage and clamp actuating devices comprising elbow levers operated by fixed ways in the reciprocation of the bolt carriage to automatically engage and release the bolt, a convex bolt rest upon which the bolt is held and clamping mechanism automatically released to permit a gravity feed of the bolt and engaged with the bolt synchronously with the automatic change in direction of movement of the carriage, an endless carrier a portion of which is located within the interior of the saw and adapted to receive the separated stave and deliver the same at the end of the machine, and holding devices engaging the bolt to maintain the same in alignment when the clamps are released.

11. In a machine for sawing staves, the combination with a cylinder or drum saw and means for revolving said saw, of a traversable bolt carriage having mounted thereon a relatively stationary clamp, a movable clamp also mounted upon said carriage, clamp actuating devices comprising elbow levers mounted in a frame extended from the carriage and ways fixed on the machine frame operating said levers in the reciprocation of the carriage, and holding devices engaging the bolt to maintain the same in alignment when the clamps are released.

12. In a machine for sawing staves, the combination with a cylinder or drum saw and means for rotating the same, of a traversable carriage, a movable bolt clamp mounted thereon, automatic devices for operating said clamp, a relatively stationary bolt clamp, manual devices for adjusting the latter with reference to differing sizes of bolts, a convex bolt rest upon which the bolt is held, clamping mechanism automatically released to permit a gravity feed of the bolt and engaged with the bolt synchronously with the automatic change in direction of movement of the carriage, an endless carrier a portion of which is located within the interior of the saw and adapted to receive the separated stave and deliver the same at the end of the machine, and holding devices engaging the bolt to maintain the same in alignment when the clamps are released.

13. In a machine for sawing staves the combination with a cylinder or drum and means for rotating the same, of a traversable bolt carriage, a movable bolt clamp mounted thereon, automatic devices for operating said clamp, a relatively stationary clamp and holding devices engaging the bolt to maintain the same in alignment when the clamps are released.

14. In a machine for sawing staves the combination with a cylinder or drum saw and means for rotating the same, of an endless carrier a portion of which is located within the interior of the saw and adapted to receive the separated stave and deliver the same at the end of the machine.

In testimony whereof I affix my signature in presence of two witnesses.

THOMAS H. WEBSTER.

Witnesses:
C. C. BULKLEY,
C. L. WEBSTER.